(12) United States Patent
Boesinger et al.

(10) Patent No.: US 7,020,088 B2
(45) Date of Patent: Mar. 28, 2006

(54) METHOD FOR OPERATING A DATA NETWORK

(75) Inventors: Marcus Boesinger, Stuttgart (DE); Jens Brandes, Boeblingen (DE); Dieter Marquardt, Herrenberg (DE); Peter Merget, Esslingen (DE); Franz-Josef Petry, Aidlingen (DE); Hans-Gerd Seib, Stuttgart (DE); Dieter Seidl, Reutlingen (DE); Eberhard Zeeb, Ulm-Juningen (DE)

(73) Assignee: DaimlerChrysler AG, Stuttgart (DE)

( * ) Notice: Subject to any disclaimer, the term of this patent is extended or adjusted under 35 U.S.C. 154(b) by 975 days.

(21) Appl. No.: 09/986,069

(22) Filed: Nov. 7, 2001

(65) Prior Publication Data

US 2002/0064131 A1 May 30, 2002

(30) Foreign Application Priority Data

Nov. 7, 2000 (DE) .............................. 100 55 103

(51) Int. Cl.
*H04L 12/26* (2006.01)
(52) U.S. Cl. ........................................ 370/241; 379/12
(58) Field of Classification Search ................ 370/261, 370/229, 231, 235, 241, 242, 243, 246, 247, 370/248, 251, 252, 257; 713/300; 379/12, 379/26.01, 27.03, 27.01, 29.05, 1.01
See application file for complete search history.

(56) References Cited

U.S. PATENT DOCUMENTS

| | | | | |
|---|---|---|---|---|
| 3,822,267 A | * | 7/1974 | Sorg ............................. | 544/368 |
| 4,498,196 A | * | 2/1985 | Holoyda et al. ................ | 398/9 |
| 5,760,940 A | | 6/1998 | Frigo .......................... | 359/173 |
| 5,862,465 A | | 1/1999 | Ou | |
| 6,101,016 A | * | 8/2000 | Roberts et al. ................ | 398/97 |

FOREIGN PATENT DOCUMENTS

EP 0 411 188 B1 1/1995

OTHER PUBLICATIONS

GRUNDLAGENARTIKEL, Warum so Messen, Nov. 1998, pp. 861-863, XP-002306606.

* cited by examiner

*Primary Examiner*—Brenda Pham
(74) *Attorney, Agent, or Firm*—Crowell & Moring LLP

(57) ABSTRACT

A method for operating a data network, which includes at least one transmission link, defined by a transmitter and a receiver, wherein in test mode the actual level reserve in the direction of the sensitivity limit, thus between the actual transmitting power of the transmitter and the actual sensitivity limit of the receiver, is determined for at least one transmission link. To better utilize the transmitting capacity of the data network, in test mode, the actual level reserve in the direction of the overload limit, thus between the actual transmitting power of the transmitter and the actual overload limit of the receiver, is also determined for the at least one transmission link.

16 Claims, 2 Drawing Sheets

METHOD FOR OPERATING A DATA NETWORK

BACKGROUND AND SUMMARY OF THE INVENTION

This application claims the priority of German Application No. 10055 103.3, filed Nov. 7, 2000, the disclosure of which is expressly incorporated by reference herein.

The invention relates to a method for operating a data network.

U.S. Pat. No. 5,760,940 discloses a method wherein a data network includes a plurality of network subscribers, which are connected to a central unit of the network by means of an input transmission path and an output transmission path. A multiplex unit connects an output line of the central unit to an input line of the respective network subscriber and an input line of the central unit is connected to an output line of the respective network subscriber. Correspondingly this data network is configured in the shape of a star. To determine the actual level reserve of the transmission path between the central unit and one of the network subscribers, the central unit sends a test signal having two different intensities to the respective network subscriber. The first signal strength is selected in such a manner that it exceeds a predetermined minimum signal strength, whereas the second signal strength is selected in such a manner that it lies between this minimum signal strength and the first signal strength. The respective network subscriber sends the received test signal back to the central unit, which evaluates it. In this respect the second signal strength is selected in such a manner that it can no longer be determined by the central office, when the transmitting power of the transmission path has fallen below a threshold that is still tolerable.

Thus, it can be determined with this method whether the actual level reserve in the direction of the sensitivity limit of the receiver, which represents the control reserve between the actual transmitting power of the transmitter and the actual sensitivity limit of the receiver, has a predetermined minimum value necessary for proper data transmission.

In contrast to a star-shaped configuration of the network subscribers with respect to the central unit, a data network can also have a ring structure. A data network, in particular an optical data network, may include a plurality of individual point-to-point connections. Between two adjacent points extends a segment or transmission link, which is defined on the input side by means of a transmitter and on the output side by means of a receiver. Flawless operation of the entire data network is possible only when all of the individual transmission links are capable of functioning flawlessly. This applies especially to ring systems, in which the flawless functioning of all ring segments or transmission links is absolutely mandatory, at least when it involves a closed chain of individual consecutive transmission links. The failure of a single ring segment, thus a single transmission link, leads to the failure of the entire communication. Therefore, it is important to check the functionality of the data network.

The data transmission in the data network can be disrupted, for example, by means of an external event, for example a cable break. However, a fault can also occur, as the attenuation of the signal transmission within the transmission path gradually increases owing to the ageing phenomena of individual components, such as the transmitter and the receiver. As soon as the attenuation becomes too high, the signal can no longer be transmitted properly.

European Patent EP 0 411 188 B1 discloses a method for monitoring the operating state of an electrooptical transmitter, with which a reliable distinction between the states "light" and "no light" is possible even for comparably small differences. Thus, with the aid of the known method it can be determined with relative certainty whether a signal has been transmitted properly or incorrectly. However, the prior art method cannot distinguish with respect to the cause of the error between an external event and an ageing phenomena, because as soon as the data transmission no longer functions properly, a corresponding error signal is generated.

The present invention deals with the problem of providing a method of the above-described type, which enables better utilization of the capacity of a data network.

The invention is based on the general idea of determining, in addition to the actual level reserve in the direction of the sensitivity limit, the actual level reserve in the direction of the overload limit, thereby providing the level reserve between the actual transmitting power of the transmitter and the actual overload limit of the receiver. This provides the capability of acquiring or monitoring the performance data of the data network or the respective transmission link. Owing to these measures, faulty data transmissions due to overload signals can be avoided, thus increasing the capacity of the data network.

In this respect the invention is based on the general idea of using the actual level reserve as the reference value for controlling the transmitting power of the transmitter and/or the sensitivity of the receiver. Owing to this measure the capacity of the respective transmission link and thus the entire data network can be better utilized. For example, a new transmission link has a relatively low attenuation so that the transmitter does not have to transmit with its maximum transmitting power to guarantee proper signal transmission. On the contrary, maximum signal transmission could even result in an overloading of the receiver, thus also impairing the signal transmission. As the transmission link ages, its attenuation increases. With the proposed control of the transmission power, this power can always be adapted to the actual transmission properties of the transmission link, in order to guarantee as long as possible proper data transmission for the transmission link.

The advantages of this alternative embodiment are also used in a further development of the former embodiment, according to which the transmitting power of the transmitter and/or the sensitivity of the receiver is/are regulated as a function of the determined actual level reserve in the direction of the sensitivity limit and/or in the direction of the overload limit.

In a further development of the invention, it can be monitored for at least one transmission link whether the variation of the level reserve with time in the direction of the sensitivity limit and/or the overload limit shows a decrease in the reserve. From this decrease in the reserve over time, the rate of decrease of the reserve is determined, whereby when the rate reaches or exceeds a predetermined maximum value, a corresponding report is generated. With this measure it is possible to generate, before the data network fails, a report that the failure of the network should be expected soon. Correspondingly suitable measures can be introduced. For example, in the case of a data network installed into a motor vehicle, a signal can be set that induces the motor vehicle driver to arrange for the maintenance or inspection of the vehicle in the near future.

As an alternative or in addition, a time at which the level reserve reaches a predetermined minimum value can be calculated as a function of the rate at which the level reserve decreases, whereby for the case that this calculated time reaches or falls below a predetermined minimum value, a corresponding report is generated. This measure, too, serves to give an early warning of a pending failure of the data network and, most particularly, in time to introduce countermeasures.

In a preferred embodiment the transmitter of the transmission link to be checked can send in test mode a test signal to the related receiver, whereby in test mode the actual transmitting power of the transmitter is reduced by a predetermined amount of decrease, or increased by a predetermined amount of increase. With the receiver it is then determined whether the test signal can be received properly. Hence, a negative test result is determined when the test signal is not received properly, whereas a positive test result is determined when the test signal is properly received. Hence, the actual level reserve in the direction of the sensitivity limit or the overload limit is less than the amount of reduction or increase, when the test result is negative; and at least as large as the amount of reduction or increase, when the test result is positive.

In addition or as an alternative, the actual level reserve in the direction of the sensitivity limit and/or the overload limit can also be determined because the transmitter sends in test mode a test signal to the receiver, whereby in test mode the actual sensitivity of the receiver of the transmission link to be checked is reduced by a predetermined amount of reduction or increased by a predetermined amount of increase. With the receiver it can be determined then whether the test signal is received properly, whereby a negative test result is determined when the test signal is not properly received, whereas a positive test result is determined when the test result is properly received.

In an especially preferred embodiment of the method according to the invention, the sending, receiving and evaluation of the test signal in test mode can be repeated within the same transmission link with an incrementally larger amount of reduction or increase at least until the test result is negative. Then the actual level reserve in the direction of the sensitivity limit or the overload limit is between the last amount of reduction or increase for positive test results and the first amount of reduction or increase for negative test results. In principle the actual level reserve can be determined for any arbitrary accuracy by means of a corresponding resolution of the steps, with which the test signals are repeated.

In a further development the test mode can be followed by an adaptation mode, wherein the actual transmitting power of the transmitter and/or the actual sensitivity of the receiver of the transmission link to be checked can be increased, when the actual level reserve that is found for the sensitivity is below a predetermined lower limiting value.

As an alternative or in addition, the test mode can also be followed by an adaptation mode, in which the actual transmitting power of the transmitter and/or the actual sensitivity of the receiver can be reduced, when the actual level reserve that is found in the direction of the overload limit is below a predetermined lower limiting value.

The invention is deployed preferably in such data networks, which includes several network subscribers, which are arranged between two successive transmission links, whereby each network subscriber includes the receiver of the incoming transmission link and the transmitter of the outgoing transmission link. In a special embodiment of the method, according to the invention, one of these network subscribers can be assigned a master function so that this master network subscriber initiates the test mode for at least one transmission link. Thus, especially in the case of a ring-configured data network, the test mode can be conducted with transmission links that are not directly connected to the master network subscriber, since the real test can be conducted automatically by the transmitter and receiver of the respective transmission link without the active participation of the master network subscriber. Besides initiating the individual tests, the master network subscriber can also serve to store centrally the test results of all of the transmission links in the master network subscriber. An evaluation of the actual level data can be carried out, for example, within the framework of a diagnosis of the data network. This applies especially to the case that the data network is designed in a vehicle, where the diagnosis can be carried out, for example, within the framework of a routine inspection of the vehicle.

In a preferred embodiment, the master network subscriber can initiate the test mode as a function of at least one predetermined event. Such an event can be, for example, the shut-down or start-up of the data network or external instructions for diagnosis.

It is clear that the master network subscriber can arrange for the transmission links to be checked independently of each other and in particular simultaneously together.

Expediently the transmitter of a transmission link to be checked can be scaled with respect to its transmitting power. That is, the transmitting power of the transmitter can be set. This design makes it possible to control the transmitting power in the vicinity of the transmission link. Correspondingly the receiver of the transmission link to be checked can also be scaled with respect to its sensitivity in order to implement a control of the receiver sensitivity as a function of the level reserve.

It is clear that the method, according to the invention, can be carried out in principle in any arbitrary data network, especially in an electronic data network and/or in an optical data network and/or in a cellular radio network and/or in an ultrasonic network.

Other important features and advantages of the invention are disclosed in the dependent claims and follow from the drawing and the related description of the figure with reference to the drawing.

It is clear that the features, which are mentioned above and explained below in greater detail, can be used not only in the disclosed combination but also in other combinations or alone without abandoning the scope of the present invention.

A preferred embodiment of the invention is depicted in the drawing and is explained in detail in the following description.

DETAILED DESCRIPTION OF THE PREFERRED EMBODIMENTS

Figure 1:
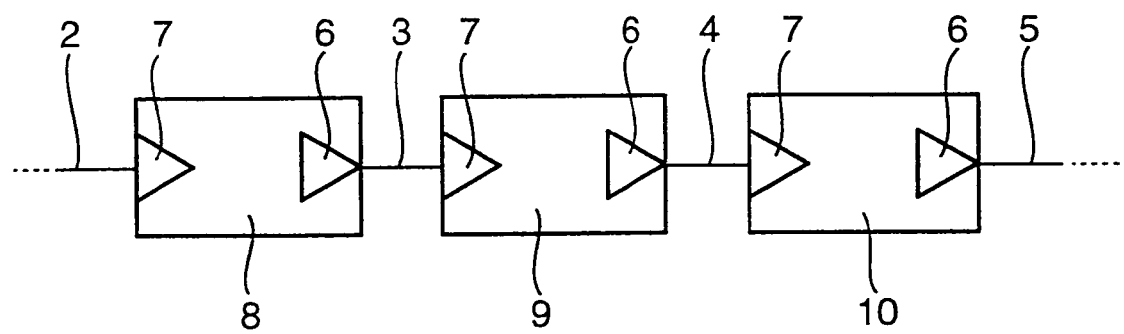
FIG. 1 depicts a schematic circuit diagram of a data network.
Figure 1:

According to FIG. 1, a data network 1 can exhibit several transmission links 2, 3, 4 and 5, which can be configured as a ring. Each transmission link 2, 3, 4, 5 is defined by a transmitter 6 on the input side and by a receiver 7 on the output side. That is, a transmitter 6 forms the beginning and a receiver 7 forms the end of each transmission link 2, 3, 4, 5. The data network 1 has several network subscribers 8, 9 and 10, which are arranged between successive transmission links 2, 3, 4, 5. Each of these network subscribers 8, 9, 10 includes the receiver 7 of the incoming transmission link 2, 3, 4, 5 and the transmitter 6 of the outgoing transmission link 2, 3, 4, 5. In each network subscriber 8, 9, 10 incoming signals are altered by way of the receiver 7 and forwarded by way of the transmitter 6, whereby the full transmitting power is always available for the next transmission link 2, 3, 4, 5. In particular in an optical data network an optical-electronic-optical change takes place in the network subscribers 8, 9, 10. In this respect the individual network subscribers 8, 9, 10 act as amplifiers.

Figure 2A:
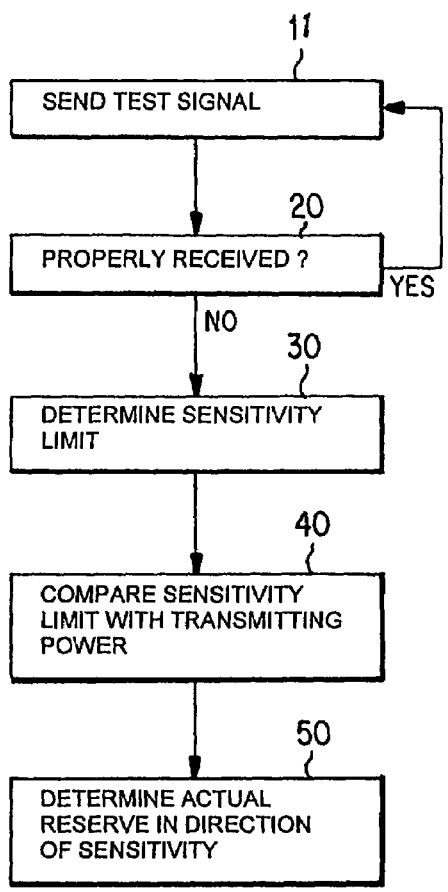
FIGS. 2a and 2b are flow charts illustrating the operation of the method of the present invention.

One of the network subscribers, labeled, for example, with the reference numeral 8, is designed as the master network subscriber. At a specific event, for example, shutdown of the data network 1, the master network subscriber 8 initiates a test mode in one, in several or in all transmission link(s) 2, 3, 4, 5. For example, the master network subscriber 8 informs the transmitter of the network subscriber, labeled 9, and the receiver 7 of the network subscriber, labeled 10, that a test is to be conducted at this stage for the transmission link, labeled 4. During the test mode, as illustrated by the flow chart in FIG. 2a. the transmitter 6 sends a test signal (step 11) over the transmission link 4 to the related receiver 7. In this respect the transmitting power of the transmitter 6 has been reduced, for example, by a predetermined amount of reduction. With the related receiver 7 it is checked (step 20) whether the test signal arrives properly. Preferably this procedure is repeated with incrementally larger amounts of reduction until the test results are negative, thus until proper reception of the test signal can no longer be determined with the receiver 7. As soon as the test signal can no longer be properly received, the actual sensitivity limit (step 30) of the receiver 7 is reached or exceeded. Then the amount of reduction that is set last and that still exhibits positive test results (step 40), thus proper reception of the test signal, is correlated with the actual level reserve (step 50) in the direction of the sensitivity limit. The results of this test procedure are reported to the master network subscriber 8.

It is clear that the transmitter 6 for carrying out this test procedure must be scalable with respect to its transmitting power.

Figure 2B:
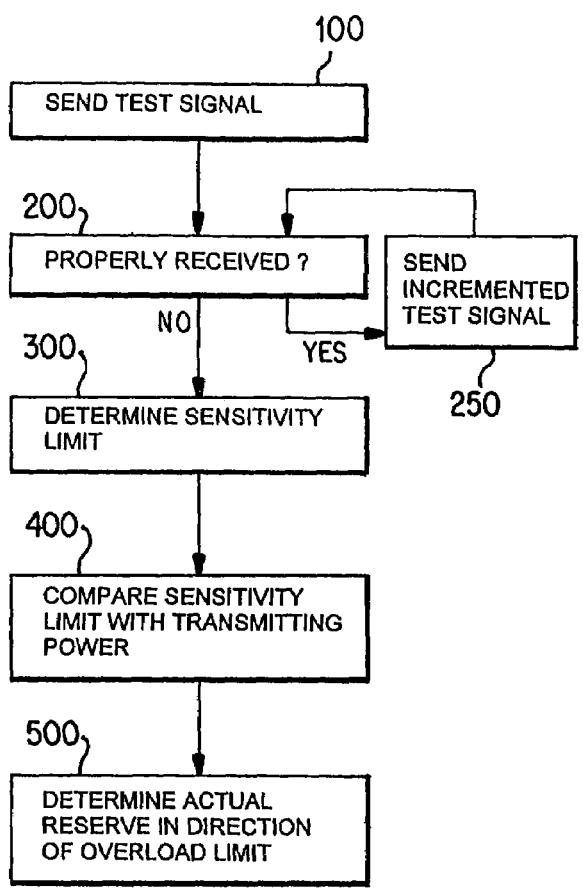

As an alternative, the test procedure can also be carried out, as shown in FIG. 2b, in such a manner that, after the initial test signal (step 100) is sent, the transmitting power of the transmitter 6 is increased incrementally (step 250) by a predetermined amount of increase. As soon as proper transmission of the signal (step 200) is no longer possible, the test results are also negative here. Proper transmission of the signal is no longer possible when the overload limit (step 300) of the receiver 7 is reached or exceeded. In this procedure (step 400) the level reserve in the direction of the overload limit (step 500) is found.

In an alternative procedure, the sensitivity limit of the receiver 7 is increased or decreased incrementally at constant transmitting power until an upper and/or lower sensitivity value is reached, at which it is just barely possible to guarantee proper data transmission. Similarly arbitrary combinations of the aforementioned procedures for incremental variation of the amount of reduction or increase of the transmitting power of the transmitter or the sensitivity of the receiver are possible.

In a preferred embodiment of the operating method for this data network 1, the transmitting power of the transmitter 6 and/or the sensitivity of the receiver 7 can be regulated as a function of the level reserves that are found. A preferred goal of this control is, for example, constant spacing of the transmitting power both downward in the direction of the sensitivity limit of the receiver and upward in the direction of the overload limit of the receiver 7.

In addition, the variation of the level reserve with time can be monitored. If it shows a decrease in the reserve, a rate for this decrease of the reserve can be determined from the decrease of the reserve as a function of time, whereby a corresponding report is generated as soon as the speed reaches or exceeds a predetermined maximum value. As an alternative or in addition, a time at which the level reserve reaches a predetermined minimum value can be calculated from the determined rate of decrease of the reserve, whereby a corresponding report is generated when the calculated time reaches or falls below a predetermined minimum value. A malfunction of the data network 1 that accompanies an eventual decrease in the reserve can be predicted with these measures. Thus, it is possible to initiate suitable preventive measures before the network 1 fails.

Although particular embodiments of the present invention has been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A method for operating a data network having at least one transmission link, each of said at least one transmission link having a transmitter and a receiver, said method comprising the steps of:
   determining, for at least one transmission link in a test mode, an actual level reserve in the direction of a sensitivity limit and thus between an actual transmitting power of the transmitter and the actual sensitivity limit of the receiver; and
   determining for said at least one transmission link in a test mode, an actual level reserve in the direction of an overload limit and thus between the actual transmitting power of the transmitter and the actual overload limit of the receiver.

2. The method as claimed in claim 1, further comprising the step of regulating at least one of the transmitting power of the transmitter in said at least one transmission link, and the sensitivity of the receiver as a function of the actual reserve level in the direction of the sensitivity limit.

3. The method as claimed in claim 1, further comprising the step of regulating at least one of the transmitting power of the transmitter of said at least one transmission link, and the sensitivity of the receiver as a function of the actual level reserve in one of the directions of the sensitivity limit and the overload limit.

4. The method as claimed claim 1, further comprising the step of monitoring whether the variation of the level reserve with time in the direction of the sensitivity limit or in the direction of the overload limit shows a decrease in the reserve; and
   determining a rate of decrease of the reserve from said decrease in the reserve over time, whereby when said rate of decrease is at least a predetermined maximum value, a corresponding report is generated.

5. The method according to claim 1, further comprising the step of monitoring whether a variation of the level reserve with time in the direction of the sensitivity limit or in the direction of the overload limit shows a decrease in the reserve; and determining a rate of decrease of the reserve from said decrease in the reserve over time, whereby a time at which the level reserve reaches a predetermined minimum value is calculated as a function of said rate of decrease so that when the calculated time reaches or falls below a predetermined minimum value, a corresponding report is generated.

6. The method as claimed claim 1, wherein said transmitter of a transmission link to be checked sends, in a test mode, a test signal to the receiver, whereby in the test mode the actual transmitting power of the transmitter is reduced by a predetermined amount of decrease or increased by a predetermined amount of increase so that a determination is made whether the test signal is properly received so that a negative test result is determined when the test signal is not properly received and a positive test result is determined when the test signal is properly received at the receiver.

7. The method according to claim 6, wherein said transmitter of a transmission link to be checked sends, in a test mode, a test signal to the receiver, whereby in the test mode the actual sensitivity of the receiver is reduced by a predetermined amount of decrease or increased by a predetermined amount of increase so that a determination is made whether the test signal is properly received so that a negative test result is determined when the test signal is not properly received and a positive test result is determined when the test signal is properly received at the receiver.

8. The method according to claim 6, wherein sending, receiving and evaluation of the test signal in test mode is repeated with an incrementally larger amount of reduction or increase at least until the test result is negative.

9. The method according to claim 1, wherein the test mode is followed by an adaptation mode, wherein the actual transmitting power of the transmitter or the actual sensitivity of the receiver is increased, when the actual level reserve found for the sensitivity is below a predetermined lower limiting value.

10. The method according to claim 1, wherein the test mode is followed by an adaptation mode, wherein the actual transmitting power of the transmitter or the actual sensitivity of the receiver is reduced, when the actual level reserve found in the direction of the overload limit is below a predetermined lower limiting value.

11. The method according to claim 1, wherein the data network has a plurality of network subscribers arranged between two successive transmission links, whereby each network subscriber includes a receiver of the incoming transmission link and the transmitter of the outgoing transmission link, and whereby one of said network subscribers is assigned a master function, which initiates the test mode for at least one transmission link.

12. The method according to claim 11, wherein the master network subscriber initiates the test mode as a function of at least one predetermined event.

13. The method according to claim 12, wherein the predetermined event is the shut-down or start-up of the data network or external instructions for diagnosis.

14. The method according to claim 1, wherein for at least one transmission link, the transmitter is scaled with respect to its transmitting power.

15. The method according to claim 1, wherein for at least one transmission link, the receiver is scaled with respect to its sensitivity.

16. The method according to claim 1, wherein the data network is one of an electronic network, an optical data network, a cellular radio and an ultrasonic network.

* * * * *